United States Patent
Omi et al.

(10) Patent No.: US 12,428,011 B2
(45) Date of Patent: Sep. 30, 2025

(54) NOTIFICATION DEVICE AND NOTIFICATION METHOD

(71) Applicants: TOYOTA JIDOSHA KABUSHIKI KAISHA, Toyota (JP); AISIN CORPORATION, Kariya (JP)

(72) Inventors: Takuhiro Omi, Anjo (JP); Hiroshi Morimoto, Tokyo-to (JP); Kenta Yamada, Tokyo-to (JP); Udara Eshan Manawadu, Tokyo-to (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 35 days.

(21) Appl. No.: 18/223,643

(22) Filed: Jul. 19, 2023

(65) Prior Publication Data

US 2024/0101133 A1 Mar. 28, 2024

(30) Foreign Application Priority Data

Sep. 22, 2022 (JP) .................................. 2022-151276

(51) Int. Cl.
*B60W 50/14* (2020.01)
*B60W 40/08* (2012.01)

(52) U.S. Cl.
CPC ............ *B60W 50/14* (2013.01); *B60W 40/08* (2013.01); *B60W 2050/146* (2013.01); *B60W 2420/403* (2013.01)

(58) Field of Classification Search
CPC .................. B60W 50/14; B60W 40/08; B60W 2050/146; B60W 2420/403
See application file for complete search history.

(56) References Cited

U.S. PATENT DOCUMENTS

| | | | | |
|---|---|---|---|---|
| 2011/0254699 | A1* | 10/2011 | Sugawara | H04W 4/44 340/901 |
| 2017/0313319 | A1 | 11/2017 | Kishi et al. | |
| 2018/0005526 | A1 | 1/2018 | Sendhoff et al. | |
| 2019/0122525 | A1* | 4/2019 | Lancelle | B60Q 9/00 |

(Continued)

FOREIGN PATENT DOCUMENTS

| | | |
|---|---|---|
| JP | H07-167668 A | 7/1995 |
| JP | 2008-071062 A | 3/2008 |

(Continued)

*Primary Examiner* — Ryan W Sherwin
(74) *Attorney, Agent, or Firm* — Oliff PLC (57) ABSTRACT

With reference to a message table associating a plurality of messages to be notified to a driver of a vehicle with a first condition, a second condition, last notification time of the message, and renotification requirement, a notification device selects messages associated with an identified first condition corresponding to a situation of surroundings of a vehicle or a state of a driver, selects, from among the messages associated with the identified first condition, messages associated with an identified second condition corresponding to a state of the driver, specifies, from among the messages associated with the identified second condition, a message without a record of last notification time or a message with a record of last notification time and with a renotification requirement requiring a renotification, and notifies the specified message to the driver through an output device.

7 Claims, 5 Drawing Sheets

| AUTONOMOUS DRIVING LEVEL | FIRST CONDITION | SECOND CONDITION | MESSAGE | LAST NOTIFICATION TIME | RENOTIFICATION REQUIREMENT |
|---|---|---|---|---|---|
| Lv2 | EXPRESSWAY/ MOTORWAY | DISTRACTED | HANDS OFF DRIVING WILL END IF MONITORING INSUFFICIENTLY | 2022/02/02 15:00 | REQUIRED |
| Lv2 | EXPRESSWAY/ MOTORWAY CONGESTION AHEAD | MONITORING | Lv3 AVAILABLE IF SPEED FALLS BELOW 60 km/h | 2022/02/02 15:30 | NOT REQUIRED |
| Lv3 | EXPRESSWAY/ MOTORWAY | NDRA | MONITORING NOT REQUIRED, BUT STANDBY REQUIRED FOR TRANSITION DEMAND | 2022/02/02 15:45 | REQUIRED |
| Lv3 | EXPRESSWAY/ MOTORWAY | NDRA | LEVEL 3 MAY BE CANCELLED IF FACE HIDDEN, SINCE STATUS CANNOT BE DETECTED | — | NOT REQUIRED |
| ⋮ | ⋮ | ⋮ | ⋮ | ⋮ | ⋮ |

721

(56) References Cited

U.S. PATENT DOCUMENTS

| | | | | |
|---|---|---|---|---|
| 2020/0139992 A1* | 5/2020 | Oba | ......................... | G08G 1/16 |
| 2020/0164797 A1* | 5/2020 | Akachi | .................... | G08B 3/10 |
| 2023/0292089 A1* | 9/2023 | Ryan | ..................... | H04W 4/021 |

FOREIGN PATENT DOCUMENTS

| | | |
|---|---|---|
| JP | 2017-021731 A | 1/2017 |
| JP | 2017-194822 A | 10/2017 |
| JP | 2017-199279 A | 11/2017 |
| JP | 2018-005886 A | 1/2018 |

\* cited by examiner

| AUTONOMOUS DRIVING LEVEL | FIRST CONDITION | SECOND CONDITION | MESSAGE | LAST NOTIFICATION TIME | RENOTIFICATION REQUIREMENT |
|---|---|---|---|---|---|
| Lv2 | EXPRESSWAY/ MOTORWAY | DISTRACTED | HANDS OFF DRIVING WILL END IF MONITORING INSUFFICIENTLY | 2022/02/02 15:00 | REQUIRED |
| Lv2 | EXPRESSWAY/ MOTORWAY CONGESTION AHEAD | MONITORING | Lv3 AVAILABLE IF SPEED FALLS BELOW 60 km/h | 2022/02/02 15:30 | NOT REQUIRED |
| Lv3 | EXPRESSWAY/ MOTORWAY | NDRA | MONITORING NOT REQUIRED, BUT STANDBY REQUIRED FOR TRANSITION DEMAND | 2022/02/02 15:45 | REQUIRED |
| Lv3 | EXPRESSWAY/ MOTORWAY | NDRA | LEVEL 3 MAY BE CANCELLED IF FACE HIDDEN, SINCE STATUS CANNOT BE DETECTED | — | NOT REQUIRED |
| .... | .... | .... | .... | .... | .... |

NOTIFICATION DEVICE AND NOTIFICATION METHOD

FIELD

The present disclosure relates to a notification device and a notification method for notifying a driver of a vehicle of a message.

BACKGROUND

Known in the art is a notification device notifying a driver of a vehicle of a message in accordance with a state of the driver. Japanese Unexamined Patent Publication No. 2017-199279 describes a driving consciousness estimation device performing awakening of the driver's attention, for example, by displaying an image on a display by using a driving readiness relating to a driving consciousness of a driver estimated based on a driver image and a traveling environment of the vehicle.

SUMMARY

A travel controller of a vehicle having a driving assistance function assists driving operations of a driver in accordance with various situations such as lane keep driving, lane changing, and driving in congestion. The driving assistance function covers diverse situations. However, it may not be easy for a driver to understand all of the aspects of the driving assistance functions and their limitations corresponding to diverse situations and to suitably utilize them. Therefore, it is desirable to suitably notify a driver of messages explaining the aspects of the driving assistance function corresponding to diverse situations.

It is an object of the present disclosure to provide a notification device that can suitably notify a driver of a vehicle of a message regarding a current situation.

A notification device according to the present disclosure includes a processor configured to select with reference to a message table in which each of plurality of messages to be notified to a driver of a vehicle is associated with a first condition representing a situation of surroundings of the vehicle for which the message should be notified, a second condition representing a state of the driver suitable for receiving the message, a last notification time of the message, and a renotification requirement indicating whether renotification of the message is required, from among the plurality of messages, at least one message associated with a first condition corresponding to a situation of surroundings of the vehicle identified by using an output signal of a positioning sensor or a surrounding sensor mounted on the vehicle. The processor is further configured to select with reference to the message table, from among the at least one message associated with the identified first condition, at least one message associated with a second condition corresponding to a state of the driver identified by using an output signal of an in-vehicle sensor mounted on the vehicle. The processor is also configured to specify with reference to the message table, from among the at least one message associated with the identified second condition, a message without a record of last notification time or a message with a record of last notification time and with a renotification requirement requiring a renotification as the message to be notified. The processor is additionally configured to notify the driver of the message to be notified through an output device.

In the notification device according to the present disclosure, preferably the message table further associates each of the plurality of messages with an autonomous driving level corresponding to a situation for which the message should be notified, and the processor in the selection of the at least one message associated with the identified first condition selects, from among the messages associated with the identified first condition, a message associated with an autonomous driving level corresponding to the autonomous driving level of the vehicle.

The processor of the notification device according to the present disclosure preferably is further configured to, when the driver is detected to recognize the notified message by using the output signal of the in-vehicle sensor, update the message table with a time of detection as the last notification time.

The processor of notification device according to the present disclosure is further configured to discriminate a driver represented in the output signal of the in-vehicle sensor from a plurality of drivers by using the output signal of the in-vehicle sensor, and in updating, updates the message table with a time of detection as the last notification time of the discriminated driver.

The processor of the notification device according to the present disclosure in the specification preferably specifies, from among messages with the record of last notification time and with the renotification requirement requiring renotification, a message with a time interval from the last notification time to the current time of more than a predetermined interval threshold as the message to be notified.

The notification method according to the present disclosure includes selecting with reference to a message table in which each of a plurality of messages to be notified to a driver of a vehicle is associated with a first condition representing a situation of surroundings of the vehicle for which the message should be notified, a second condition representing a state of the driver suitable for receiving the message, a last notification time of the message, and a renotification requirement indicating whether renotification of the message is required, from among the plurality of messages, at least one message associated with a first condition corresponding to a situation of surroundings of the vehicle identified by using an output signal of a positioning sensor or a surrounding sensor mounted on the vehicle, selecting with reference to the message table, from among the at least one message associated with the identified first condition, at least one message associated with a second condition corresponding to a state of the driver identified by using an output signal of an in-vehicle sensor mounted on the vehicle, specifying with reference to the message table, from among the at least one message associated with the identified second condition, a message without a record of the last notification time or a message with a record of the last notification time and with a renotification requirement requiring a renotification as the message to be notified, and notifying the driver of the message to be notified through an output device.

A computer program for notification stored in a non-transitory computer-readable medium according to the present disclosure causes a compute to execute a process including selecting with reference to a message table in which each of a plurality of messages to be notified to a driver of a vehicle is associated with a first condition representing a situation of surroundings of the vehicle for which the message should be notified, a second condition representing a state of the driver suitable for receiving the message, a last notification time of the message, and a renotification requirement indicating whether renotification of the message is required, from among the plurality of messages, at least one message associated with a first condition corresponding to a situation of surroundings of the vehicle identified by using an output signal of a positioning sensor or a surrounding sensor mounted in the vehicle, selecting with reference to the message table, from among the at least one message associated with the identified first condition, at least one message associated with a second condition corresponding to a state of the driver identified by using an output signal of an in-vehicle sensor mounted on the vehicle, specifying with reference to the message table, from among the at least one message associated with the identified second condition, a message without a record of the last notification time or a message with a record of the last notification time and with a renotification requirement requiring a renotification as a message to be notified, and notify the driver of the message to be notified through an output device.

The notification device according to the present disclosure can suitably notify a driver of a vehicle of a message regarding a current situation.

DESCRIPTION OF EMBODIMENTS

A notification device that can suitably notify a driver of a vehicle of a message regarding a current situation will now be described in detail with reference to the attached drawings. The notification device identifies a first condition corresponding to a situation of surroundings of a vehicle or a state of a driver of the vehicle and selects with reference to a message table, from among a plurality of messages to be notified to the driver, at least one message associated with the identified first condition. In the message table, each of the plurality of messages is associated with a first condition representing a situation of surroundings of the vehicle for which the message should be notified, a second condition representing a state of the driver suitable for receiving the message, a last notification time of the message, and a renotification requirement indicating whether renotification of the message is required. The situation of the surroundings of the vehicle is identified by using an output signal of a positioning sensor or a surrounding sensor mounted on the vehicle. The state of the driver is identified by using an output signal of an in-vehicle sensor mounted on the vehicle. The notification device selects with reference to the message table, from among the at least one message associated with the identified first condition, at least one message associated with a second condition corresponding to a state of the driver. The notification device specifies with reference to the message table, from among the at least one message associated with the identified second condition, a message without a record of the last notification time or a message with a record of the last notification time and with a renotification requirement requiring a renotification as a message to be notified. Further, the notification device notifies the message to be notified to the driver through an output device.

Figure 1:
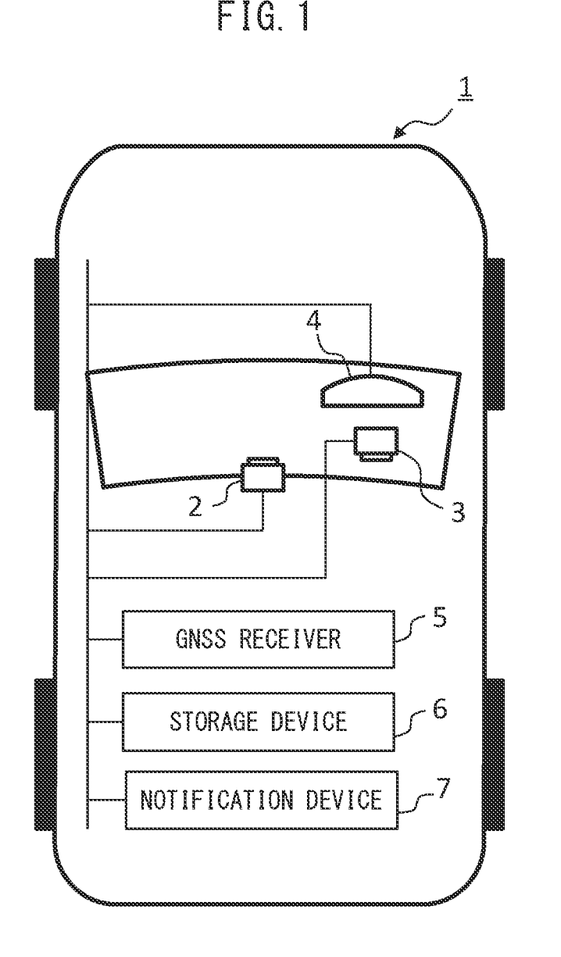
FIG. 1 schematically illustrates the configuration of a vehicle equipped with a notification device.

FIG. 1 schematically illustrates a vehicle in which the notification device is mounted.

The vehicle 1 includes a surrounding camera 2, a driver monitor camera 3, a meter display 4, a global navigation satellite system (GNSS) receiver 5, a storage device 6, and a notification device 7. The surrounding camera 2, driver monitor camera 3, the meter display 4, the GNSS receiver 5, and the storage device 6 are connected to the notification device 7 via an in-vehicle network conforming to a standard, such as a controller area network, so that they can communicate with each other.

The surrounding camera 2 is an example of a surrounding sensor for generating an output signal representing the situation of surroundings of the vehicle. The surrounding camera 2 includes a two-dimensional detector constructed from an array of optoelectronic transducers, such as CCD or C-MOS, having sensitivity to visible light and a focusing optical system that forms an image of a target region on the two-dimensional detector. The surrounding camera 2 is disposed, for example, in a front and upper area in the interior of the vehicle and oriented forward, takes a picture of the surroundings of the vehicle 1 through a windshield every predetermined capturing period (e.g., $\frac{1}{30}$ to $\frac{1}{10}$ seconds), and outputs surrounding images representing the situation of the surroundings.

The driver monitor camera 3 is an example of the in-vehicle sensor for generating an output signal representing the situation of the driver of the vehicle. The driver monitor camera 3 includes a two-dimensional detector constructed from an array of optoelectronic transducers, such as CCD or C-MOS, having sensitivity to infrared light and a focusing optical system that forms an image of a target region on the two-dimensional detector. Further, driver monitor camera 3 has a light source emitting infrared light. The surrounding camera 2 is, for example, mounted in a front part of the interior of the vehicle oriented toward the face of the driver sitting at the driver's seat. The driver monitor camera 3 emits infrared light to the driver every predetermined capturing period (e.g., $\frac{1}{30}$ to $\frac{1}{10}$ seconds) and outputs facial images in which the face of the driver is shown in a time series.

The meter display 4, which is an example of an output device, includes, for example, a liquid crystal display. The meter display 4 displays an image notifying a message to the driver according to a signal received from the notification device 7 via the in-vehicle network. The meter display 4 may have a touch panel superposed on the liquid crystal display and detecting operations of the driver. In this case, the touch panel is an example of an in-vehicle sensor for generating an output signal representing the state of the driver of the vehicle.

The GNSS receiver 5, which is an example of a positioning sensor, receives GNSS signals from GNSS satellites at predetermined intervals and determines the position of the vehicle 1 based on the received GNSS signals. The GNSS receiver 5 outputs positioning signals each indicating the result of determination of the position of the vehicle 1 based on the GNSS signals to the notification device 7 via the in-vehicle network at predetermined intervals.

The storage device 6, which is an example of a storage unit, includes, for example, a hard disk drive or a nonvolatile semiconductor memory. The storage device 6 contains high-definition maps. The high-definition maps for example include information representing attributes of roads (such as roads only for automobiles, highways, and general roads) include in predetermined regions shown in those high-definition maps.

The notification device 7 is an electronic control unit (ECU) provided with a communication interface, a memory, and a processor. The notification device 7 selects a message stored in the memory and display the selected message on the meter display 4 by using output signals of the surrounding camera 2 and the driver monitor camera 3.

Figure 2:
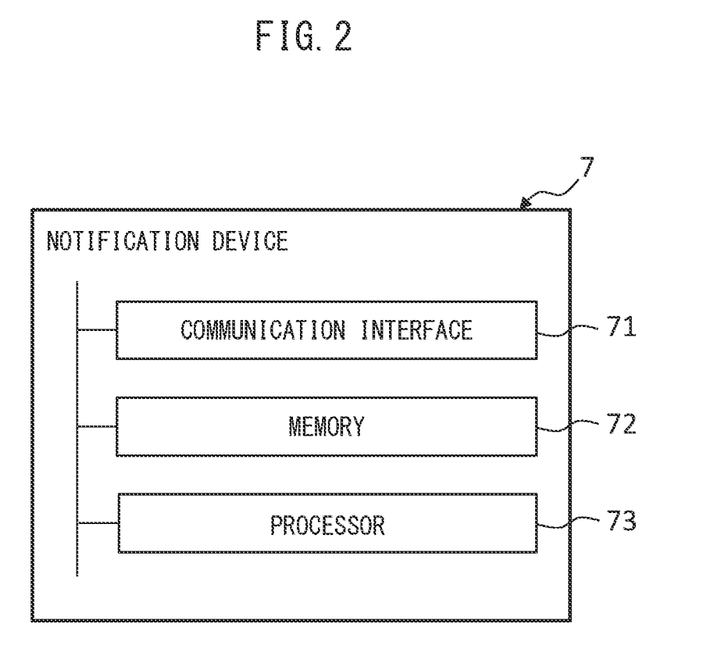
FIG. 2 schematically illustrates hardware of the notification device.

FIG. 3 schematically illustrates the hardware of the notification device 7.

The communication interface 71, which is an example of a communication unit, includes a communication interface circuit for connecting the notification device 7 to the in-vehicle network. The communication interface 71 provides received data to the processor 73. The communication interface 71 also outputs data provided from the processor 73 to an external device.

The memory 72, which is another example of a storage unit, includes volatile and nonvolatile semiconductor memories. The memory 72 stores various types of data used for processing by the processor 73, e.g., a message table in which each of a plurality of messages to be notified to the driver of the vehicle 1 is associated with a first condition, second condition, last notification time, and renotification requirement. The memory 72 also stores various application programs, such as a computer program for notification to execute a process therefor.

Figure 3:
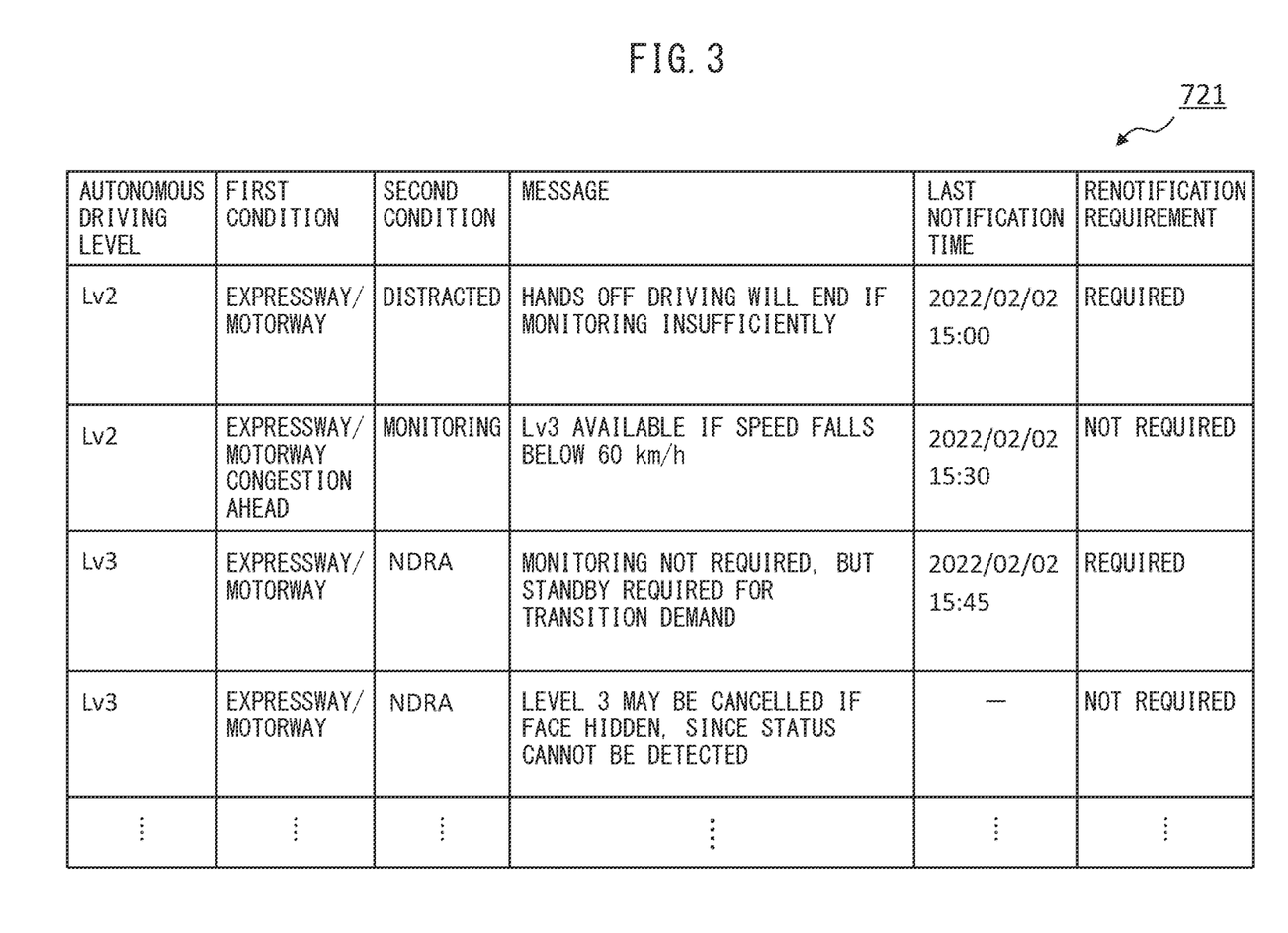
FIG. 3 illustrates an example of a message table.

FIG. 3 illustrates an example of the message table.

The memory 72 stores a message table 721. In the message table 721, each of a plurality of messages is associated with an "autonomous driving level", a "first condition", a "second condition", a "last notification time", and a "renotification requirement".

A "message" is text information expressing content to be notified to the driver of the vehicle 1. The message may be image information or voice information expressing content to be notified to the driver of the vehicle 1.

An "autonomous driving level" is information indicating an autonomous driving level of the vehicle 1 corresponding to a situation for which each of the plurality of messages should be notified. The travel of the vehicle 1 may be under control in a predetermined autonomous driving level by a travel controller (not shown) connected to an in-vehicle network outputting control signals to travel mechanisms (not shown) such as the engine or motor, brake, or steering mechanism of the vehicle 1. The autonomous driving levels are defined in advance based on the contents of the operations controlled by the travel controller, the entities monitoring the travel, etc. For example, when the "autonomous driving level" associated with a message is "Lv2", this shows that the message is a message which should be notified when the travel of the vehicle 1 is under control in the autonomous driving level 2.

A "first condition" is a condition representing a situation of the surroundings of the vehicle for which each of the plurality of messages should be notified. For example, when the "first condition" associated with a message is "Expressway/motorway," this shows that the message is a message which should be notified when the surroundings of the vehicle 1 are an expressway or a motorway (the vehicle 1 is traveling on an expressway or a motorway).

A "second condition" is a condition representing a state of a driver suitable for receiving a message. For example, when the "second condition" associated with a message is "NDRA," this shows that the message is a message which should be notified when the driver of the vehicle 1 is engaged in a non-driving related activity (for example, operating a smartphone).

A "last notification time" is information indicating the time when the message was last notified. The "last notification time" may be indicated by the date and time or may be indicated by only the date (messages with a record of the "last notification time"). "-" is recorded as the "last notification time of an unnotified message. Information other than "-," such as "unnotified" and "0" (null), may be recorded in the "last notification time" of an unnotified message (collectively, messages without a record of the "last notification time").

A "renotification requirement" is information indicating whether renotification of a message is required. The notification device 7 generally excludes a message with a record of the "last notification time" (an already notified message) from messages to be notified. When the "renotification requirement" is "required," this shows that the message is a message to be notified regardless of a r record of the "last notification time."

In the message table 721, the "message", "autonomous driving level", "first condition", and "second condition" are set in advance by a predetermined administrator. A "last notification time" is the time of notification recorded in response to a notification of a message to the driver of the vehicle 1 by the notification device 7. A "renotification requirement" is recorded in accordance with an operation of the driver of the vehicle 1 received through a predetermined user interface provided by the notification device 7 (for example, touching of the touch panel of the meter display 4 displaying a message inquiring requirement). The administrator may also set the "renotification requirement" of a predetermined message to be repeatedly notified to "required" in advance.

Returning to FIG. 2, the processor 73, which is an example of a control unit, includes one or more processors and a peripheral circuit thereof. The processor 73 may further include another operating circuit, such as a logic-arithmetic unit, an arithmetic unit, or a graphics processing unit.

Figure 4:
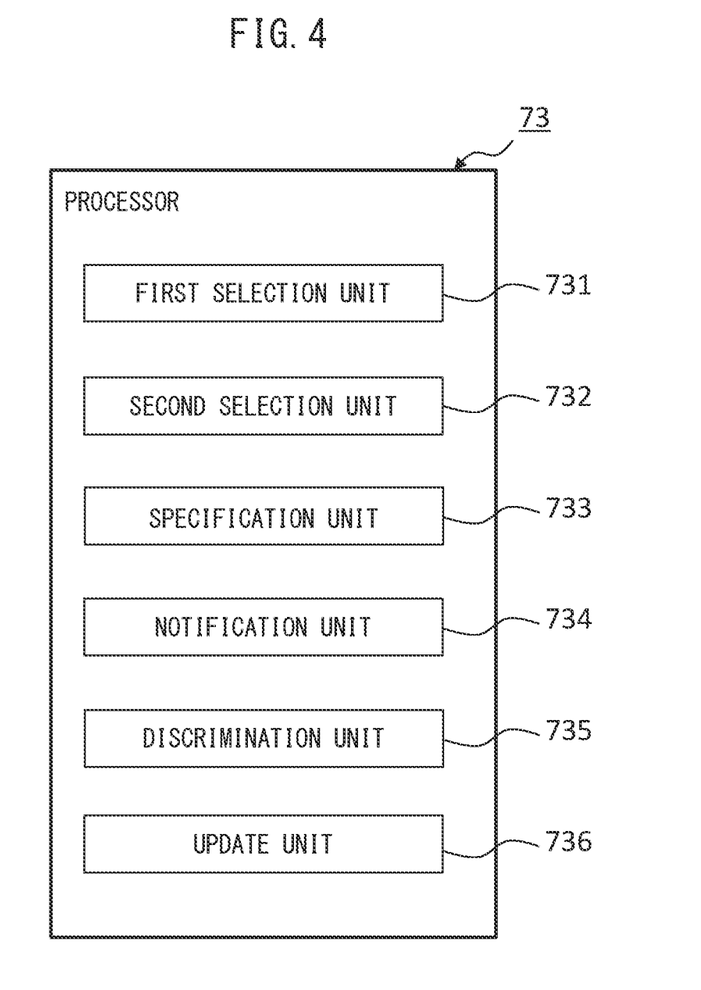
FIG. 4 is a functional block diagram of a processor included in the notification device.

FIG. 4 is a functional block diagram of the processor 73 included in the notification device 7.

As its functional blocks, the processor 73 of the notification device 7 includes a first selection unit 731, a second selection unit 732, a specification unit 733, a notification unit 734, a discrimination unit 735, and an update unit 736. These units included in the processor 73 are functional modules implemented by a computer program executed on the processor 73. The computer program for achieving the functions of the units of the processor 73 may be provided in a form recorded on a computer-readable and portable recording medium, such as a semiconductor memory, a magnetic recording medium, or an optical recording medium. Alternatively, the units included in the processor 73 may be implemented in the notification device 7 as separate integrated circuits, microprocessors, or firmware.

The first selection unit 731 identifies the situation of surroundings of the vehicle 1 by using a positioning signal outputted by the GNSS receiver 5 or a surrounding image outputted by the surrounding camera 2. For example, the first selection unit 731 identifies the type of road at the point indicated by the positioning signal with reference to the high-definition map stored in the storage device 6. Further, the first selection unit 731 selects, from among the messages included in the message table 721, a message where the type of road represented as a first condition associated with the message matches the identified type of road.

The first selection unit 731 may acquire congestion information of the surroundings of the point indicated by the positioning signal from a VIC S (Vehicle Information and Communication System) center through the communication interface 71 and the data communication module (not shown) connected to the in-vehicle network. If detecting the congestion ahead of the vehicle 1, the first selection unit 731 selects, from among the messages included in the message table 721, a message including the congestion ahead in the first condition associated with the message.

The first selection unit 731 may also input a surrounding image in a classifier that has been trained in advance to detect a region representing a vehicle from the image and detect another vehicle in the surroundings of the vehicle 1. The first selection unit 731 selects, from among the messages included in the message table 721, a message where the presence of another vehicle represented as a first condition associated with the message matches the presence of the identified other vehicle.

In this way, the first selection unit 731 selects with reference to the message table 721 at least one message associated with the first condition corresponding to the identified situation in the surroundings of the vehicle 1.

The first selection unit 731 may further select, from among the messages associated with the first condition a message, a message with which an autonomous driving level corresponding to the autonomous driving level of the vehicle 1 is associated. For example, assume the travel controller of the vehicle 1 is controlling travel of the vehicle 1 in the autonomous driving level 3. In this case, the first selection unit 731 selects with reference to the message table 721 a message with an "autonomous driving level" as "Lv3". By operating in this way, the notification device 7 can more suitably specify a message to be notified.

The second selection unit 732 identifies the state of the driver by using a facial image outputted by the driver monitor camera 3. For example, the second selection unit 732 inputs the facial image into a classifier which has been trained to detect the positions of specific portions of the face, such as the outer corner of the eye, the inner corner of the eye, and the corner of the mouth, to thereby identify predetermined portions included in the facial image.

The classifier may be, for example, a convolutional neural network (CNN) including a plurality of convolution layers connected in series from the input toward the output. A CNN that has been trained using facial image including predetermined portions of the face as training data operates as a classifier to identify the positions of predetermined portions of the face.

The second selection unit 732 compares the positions of the predetermined portions detected from the facial image against a standard 3D model of the face. The second selection unit 732 detects a facial orientation in the 3D model when the portions of the portions most match the positions of the portions detected from the facial image as the facial orientation in the facial image.

For example, when the facial orientation is the advancing direction, the second selection unit 732 can identify the state of the driver as being "monitoring driving". When the facial orientation is off to the left or right from the advancing direction, the second selection unit 732 can identify the state of the driver as being "distracted". When the facial orientation is downward (looking at his or her hands), the second selection unit 732 can identify the state of the driver as "NDRA" (operating a smartphone).

The second selection unit 732 selects, from among the selected at least one message, a message where the state of the driver represented as a second condition associated with the message matches the identified state of the driver. In this way, the second selection unit 732 selects with reference to the message table 721, from among the selected at least one message, at least one message associated with the second condition corresponding to the identified state of the driver.

The specification unit 733 reads out with reference to the message table 721, at least the "last notification time" and "renotification requirement" of the message associated with the identified second condition. The specification unit 733 determines whether the "last notification time" has been recorded for at least the message associated with the selected second condition and specifies a message without a record of "last notification time" as a message to be notified.

The specification unit 733 specifies, among the messages with a record of "last notification time," a message with a "renotification requirement" which is "required" as a message to be notified. Note that, the number of the specified messages to be notified is not limited to one, and may be zero or may be two or more.

The specification unit 733 may specify, from among the messages with a record of "last notification time" and with a "renotification requirement" which is "required," a message with the time interval from the recorded "last notification time" to the current time is more than a predetermined interval threshold (for example, six months) as the message to be notified. By operating in this way, the notification device 7 repeatedly can notify a message at suitable intervals and suitably convey the content of the message.

The notification unit 734 notifies the driver by displaying the message to be notified on a meter display 4. The notification unit 734 may also notify the driver of the message to be notified through a speaker (not shown).

The discrimination unit 735 discriminates the driver represented in the facial image from a plurality of drivers uses the positions of predetermined portions included in the facial image outputted by the driver monitor camera 3. For example, the discrimination unit 735 identifies the positions of the predetermined portions contained in the facial image by inputting a facial image into a classifier which has been trained to detect the positions of predetermined portions of the face such as the outer corner of the eye, the inner corner of the eye, and the corner of the mouth.

The update unit 736 detects the driver recognized the notified message by using an output signal corresponding to an operation by the driver on a touch panel of a meter display 4 displaying a message to be notified.

If detecting that the notified message was recognized by the driver, the update unit 736 updates the message table 721 with the time of detection as the "last notification time". By operating in this way, the notification device 7 can suitably update the message table 721 with the "last notification time" and avoid a situation where the same message is repeatedly notified.

The update unit 736 may also detect the recognition of the notified message by the driver by using an output signal of a microphone (not shown) receiving a voice of a driver confirming the recognition of the message. The update unit 736 may update the message table 721 with the time of detection as the "last notification time" subject to the facial direction detected from the facial image outputted by the driver monitor camera 3 directed to the meter display 4 displaying the message.

The update unit 736 may update the message table 721 with the "last notification time" for each of a plurality of drivers. By updating the message table 721 with the "last notification of time" for each of the plurality of drivers, even if each of a plurality of drivers may operate the vehicle 1 at a different time, it is possible to avoid a situation where notification of a message to one driver causes messages to other drivers to not be notified.

Figure 5:
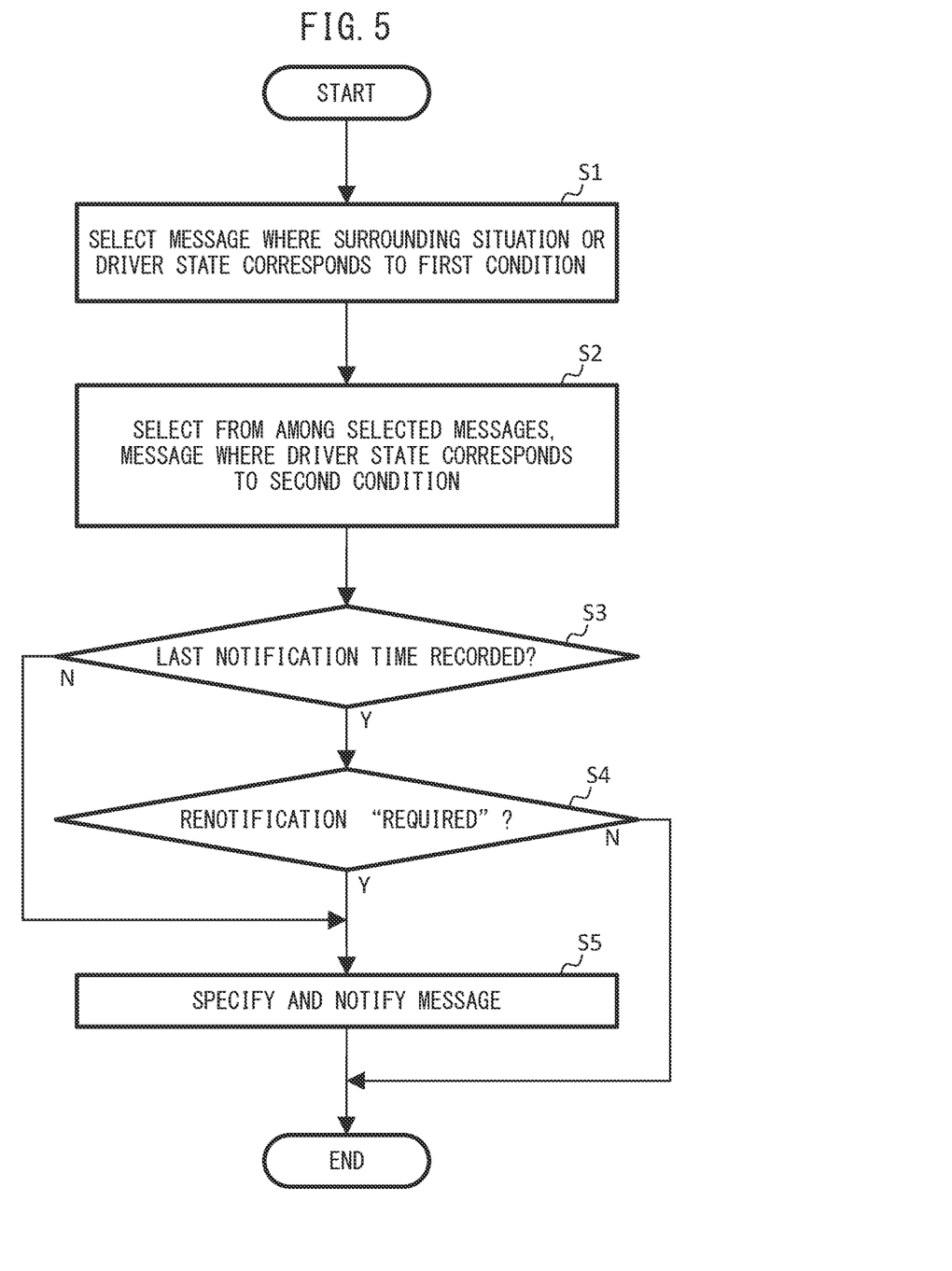
FIG. 5 is a flowchart of a process for notification.

FIG. 5 is a flowchart of a process of notification. The notification device 7 repeats the process of notification shown in FIG. 6 at predetermined time intervals (e.g., intervals of 30 seconds) during travel of the vehicle 1.

The first selection unit 731 of the notification device 7 identifies the state of surroundings of the vehicle 1 by using the positioning signal outputted by the GNSS receiver 5 or surrounding image outputted by the surrounding camera 2. Further, the first selection unit 731 selects with reference to the message table 721 at least one message associated with the first condition corresponding to the identified state of the surroundings of the vehicle 1 (step S1).

Next, the second selection unit 732 of the notification device 7 identifies the state of the driver by using the facial image outputted by the driver monitor camera 3. Further, the second selection unit 732 selects with reference to the message table 721, from among the selected at least one message, at least one message associated with the second condition corresponding to the identified state of the driver (step S2).

After this, the specification unit 733 of the notification device 7 determines whether the "last notification time" is recorded for at least one message associated with the selected second condition (step S3).

If it is determined that "last notification time" is recorded (step S3: Y), the specification unit 733 determines whether the "renotification requirement" is "required" for the message (step S4).

If it is determined that the "last notification time" is not recorded for the message (step S3: N) or it is determined that "renotification requirement" is "required" (step S4: Y), the specification unit 733 specifies the determined message as a message for notification, notifies the driver thereof through an output device (step S5), and terminates the process of notification. Note that, if multiple messages are selected at step S2, the notification device may repeat the process of step S3 to step S5 for the times corresponding to the number of the selected messages.

If it is determined that the "renotification requirement" is not "required" for the message (step S4: N), the notification device 7 terminates the process of notification.

By performing the process of notification in this way, the notification device 7 suitably notifies the driver of the vehicle of a message regarding a current situation.

According to a modification, in the above-mentioned flowchart of the process of notification, step S1 and step S2 are performed switched in order. That is, first, the second selection unit 732 selects at least one message associated with a second condition corresponding to the state of the driver. Further, the first selection unit 731 selects, from among the selected at least one message, at least one message associated with a first condition corresponding to the state of the surroundings of the vehicle.

Note that those skilled in the art can apply various changes, substitutions, and modifications without departing from the spirit and scope of the present disclosure.

What is claimed is:

1. A notification device comprising a processor configured to:
   select with reference to a message table in which each of a plurality of messages to be notified to a driver of a vehicle is associated with a first condition representing a situation of surroundings of the vehicle for which a message from among the plurality of messages should be notified, a second condition representing a state of the driver suitable for receiving the message, a last notification time of the message, and a renotification requirement indicating that notification of the message is required regardless of the last notification time of the message, at least one message associated with a first condition corresponding to a situation of surroundings of the vehicle identified by using an output signal of a positioning sensor or a surrounding sensor mounted on the vehicle,
   select with reference to the message table, from among the at least one message associated with the identified first condition, at least one message associated with a second condition corresponding to a state of the driver identified by using an output signal of an in-vehicle sensor mounted on the vehicle,
   specify with reference to the message table, from among the at least one message associated with the identified second condition, (i) a message without a record of the last notification time, or (ii) a message with a record of the last notification time and with a renotification requirement requiring a renotification, as a message to be notified, and
   notify the driver of the message to be notified through an output device,
   wherein the processor specifies the message with a record of the last notification time and with a renotification requirement only after selecting the at least one message associated with the second condition and determining whether the last notification time is recorded.

2. The notification device according to claim 1, wherein the message table further associates each of the plurality of messages with an autonomous driving level corresponding to a situation for which the message should be notified, and
   in the selection of the at least one message associated with the identified first condition, the processor selects, from among the messages associated with the identified first condition, a message associated with an autonomous driving level corresponding to the autonomous driving level of the vehicle.

3. The notification device according to claim 1, wherein the processor is further configured to, when the driver is detected to recognize the notified message by using the output signal of the in-vehicle sensor, update the message table with a time of detection as the last notification time.

4. The notification device according to claim 3, wherein the processor is further configured to discriminate a driver represented in the output signal of the in-vehicle sensor from a plurality of drivers by using the output signal of the in-vehicle sensor and,
   the processor, in the updating, updates the message table with a time of detection as the last notification time of the discriminated driver.

5. The notification device according to claim 1, wherein the processor, in the specification, specifies, from among messages with the record of the last notification time and with the renotification requirement requiring renotification, a message with a time interval from the last notification time to the current time of more than a predetermined interval threshold as the message to be notified.

6. A notification method, comprising:
   selecting with reference to a message table in which each of a plurality of messages to be notified to a driver of a vehicle is associated with a first condition representing a situation of surroundings of the vehicle for which a message from among the plurality of messages should be notified, a second condition representing a state of the driver suitable for receiving the message, a last notification time of the message, and a renotification requirement indicating that notification of the message is required regardless of the last notification time of the message, at least one message associated with a first condition corresponding to a situation of surroundings of the vehicle identified by using an output signal of a positioning sensor or a surrounding sensor mounted on the vehicle, selecting with reference to the message table, from among the at least one message associated with the identified first condition, at least one message associated with a second condition corresponding to a state of the driver identified by using an output signal of an in-vehicle sensor mounted on the vehicle, specifying with reference to the message table, from among the at least one message associated with the identified second condition, (i) a message without a record of the last notification time, or (ii) a message with a record of the last notification time and with a renotification requirement requiring a renotification, as a message to be notified, and notifying the driver of the message to be notified through an output device, wherein specifying the message with a record of the last notification time and with a renotification requirement is performed only after selecting the at least one message associated with the second condition and determining whether the last notification time is recorded.

7. A non-transitory computer-readable medium having a computer program for notification stored therein, the computer program causing a computer to execute a process comprising:

selecting with reference to a message table in which each of a plurality of messages to be notified to a driver of a vehicle is associated with a first condition representing a situation of surroundings of the vehicle for which a message from among the plurality of messages should be notified, a second condition representing a state of the driver suitable for receiving the message, a last notification time of the message, and a renotification requirement indicating that notification of the message is required regardless of the last notification time of the message, at least one message associated with a first condition corresponding to a situation of surroundings of the vehicle identified by using an output signal of a positioning sensor or a surrounding sensor mounted on the vehicle, selecting with reference to the message table, from among the at least one message associated with the identified first condition, at least one message associated with a second condition corresponding to a state of the driver identified by using an output signal of an in-vehicle sensor mounted on the vehicle, specifying with reference to the message table, from among the at least one message associated with the identified second condition, (i) a message without a record of the last notification time, or (ii) a message with a record of the last notification time and with a renotification requirement requiring a renotification, as a message to be notified, and notifying the driver of the message to be notified through an output device, wherein specifying the message with a record of the last notification time and with a renotification requirement is performed only after selecting the at least one message associated with the second condition and determining whether the last notification time is recorded.

* * * * *